US005479813A

United States Patent [19]

Pla et al.

[11] Patent Number: 5,479,813

[45] Date of Patent: Jan. 2, 1996

[54] SENSOR MATCHING THROUGH REAL-TIME OUTPUT COMPENSATION

[75] Inventors: Frederic G. Pla, Schenectady; Robert A. Hedeen, Clifton Park, both of N.Y.

[73] Assignee: General Electric Company, Schenectady, N.Y.

[21] Appl. No.: 438,717

[22] Filed: May 11, 1995

Related U.S. Application Data

[62] Division of Ser. No. 243,343, May 16, 1994.

[51] Int. Cl.[6] .......................... G01L 27/00; G01D 18/00

[52] U.S. Cl. ........................................ 73/4 R; 364/571.02

[58] Field of Search ......................... 364/571.02, 571.04, 364/571.01, 571.03, 571.05–571.08, 572, 558; 367/13; 73/1 A, 1 DV, 4 R, 866.1; 381/56, 58

[56] References Cited

U.S. PATENT DOCUMENTS

| | | | |
|---|---|---|---|
| 4,038,532 | 7/1977 | Burris et al. | 73/753 X |
| 4,907,441 | 3/1990 | Shurmer | 73/23.2 |
| 5,029,215 | 7/1991 | Miller, II | 367/13 X |
| 5,125,260 | 6/1992 | Hedeen | 73/10 V |
| 5,150,314 | 9/1992 | Garratt et al. | 364/571.02 |
| 5,161,405 | 11/1992 | Macqueene | 73/1 R |
| 5,172,597 | 12/1992 | Hedeen | 73/646 |
| 5,402,669 | 4/1995 | Pla et al. | 73/4 R |
| 5,412,584 | 5/1995 | Umeno et al. | 364/558 |
| 5,419,198 | 5/1995 | Pla | 73/660 |
| 5,420,514 | 5/1995 | Wardle et al. | 364/571.01 X |
| 5,420,793 | 5/1995 | Oo et al. | 364/571.04 X |
| 5,426,596 | 6/1995 | Ogawa et al. | 364/571.01 |
| 5,428,558 | 6/1995 | Cahill et al. | 73/1 GX |
| 5,444,639 | 8/1995 | White | 364/572 |

FOREIGN PATENT DOCUMENTS

| | | | |
|---|---|---|---|
| 2628074 | 12/1977 | Germany | 364/571.02 |
| 107142 | 8/1981 | Japan | 73/4 R |
| 645092 | 1/1979 | U.S.S.R. | 364/571.02 |

OTHER PUBLICATIONS

"Adaptive Signal Processing", Widrow et al., 1985 by Prentice–Hall, Inc., Englewood Cliffs, N.J., pp. 17 and 100.(both pages partially incomplete).

*Primary Examiner*—Thomas P. Noland
*Attorney, Agent, or Firm*—Douglas E. Erickson

[57] ABSTRACT

The output of a second sensor is matched to the output of a first sensor. The sensors, such as two microphones, are generally identically and simultaneously exposed to a physical quantity which they have been designed to sense. Their outputs are presented as digital outputs. The second sensor's digital output is numerically adaptively filtered using an adaptive filter having adaptive filtering coefficients. The filter's output is equal to the sum of the products of the second sensor's digital outputs and the associated adaptive filtering coefficients, with the sum taken over a predetermined number of sampling intervals. The adaptive filtering continues until the adaptive filtering coefficients are determined such that the filter's output matches the first sensor's digital output to within a predetermined value. Thereafter, the second sensor's digital output is filtered with fixed coefficients which are equal to the adaptively-determined coefficients.

2 Claims, 1 Drawing Sheet

SENSOR MATCHING THROUGH REAL-TIME OUTPUT COMPENSATION

This application is a division, of application Ser. No. 08/243,343, filed May 16, 1994.

BACKGROUND OF THE INVENTION

The present invention relates generally to matching sensors, and more particularly to compensating the output of one sensor in real time to accurately match the output of another sensor.

Sensors include sensors with analog outputs and sensors with digital outputs. Sensors measure physical quantities and include conventional displacement, velocity, acceleration, force, and pressure sensors. Pressure sensors include pressure transducers such as microphones. Certain applications, such as the evaluation of acoustic particle velocity through a pressure gradient measurement, require using two microphones having outputs which are accurately matched in amplitude and phase. Inexpensive microphones costing a few dollars do not have the amplitude and phase of their outputs accurately matched to each other, or to a reference microphone, due to manufacturing tolerances or design differences. Such inexpensive microphones are not suitable for precise measurement applications. It is known to use an expensive pair of matched microphones, costing several thousands of dollars, for precise applications. It is also known (U.S. Pat. No. 5,125,260) to use a computer to store measured phase and amplitude frequency responses of two unmatched microphones, to apply curve fits to such responses to extract phase and amplitude correction coefficients for each microphone, to store the amplitude and phase correction coefficients in an independent computer data base, and to later use such amplitude and phase correction coefficients to computationally compensate the unmatched microphone pair for phase and amplitude mismatch. Such known sensor output compensation technique operates in the frequency domain and does not operate in real time (i.e., such technique does not automatically compensate the unmatched outputs of the microphone pair at the instant the pair is sensing acoustic pressure). What is needed is a relatively inexpensive technique to accurately match the outputs of unmatched sensors in real time.

SUMMARY OF THE INVENTION

It is an object of the invention to provide a technique which compensates the output of one sensor to match the output of another sensor in generally real time.

The method of the invention is a method for matching the second output of a second sensor to the first output of a first sensor, wherein the first and second sensors sense the same physical quantity. The method includes the steps of: a) generally identically and simultaneously exposing the first and second sensors to a source of the physical quantity they can sense; b) presenting the first output of the first sensor as a sampled first digital output; c) presenting the second output of the second sensor as a sampled second digital output; and d) numerically adaptively filtering the second digital output with a second filter having adaptive second filtering coefficients until the second filtering coefficients are determined such that the filtered second digital output matches the first digital output to within a second predetermined value.

The sensor assembly of the invention includes: a) a sensor having an analog output; b) an analog-to-digital converter having an analog input side operatively connected to the analog output, having a sampling interval, and having a digital output side yielding a digital output for each sampling interval; and c) a filter having an input side operatively connected to the digital output side of the analog-to-digital converter and having an output equal to the sum of the products of the digital outputs and associated fixed filtering coefficients, the sum taken over a predetermined number of sampling intervals, and the fixed filtering coefficients being set equal to filtering coefficients adaptively-determined such that the output of the filter generally matches a reference digital output from a reference sensor.

Several benefits and advantages are derived from the invention. The adaptive filter compensates the output of the second sensor to accurately match the output of the first sensor in generally real time using a generally inexpensive, unmatched second sensor.

BRIEF DESCRIPTION OF THE DRAWINGS

The accompanying drawings illustrate two preferred embodiments of the present invention wherein.

DETAILED DESCRIPTION OF THE INVENTION

Figures 1, 2:
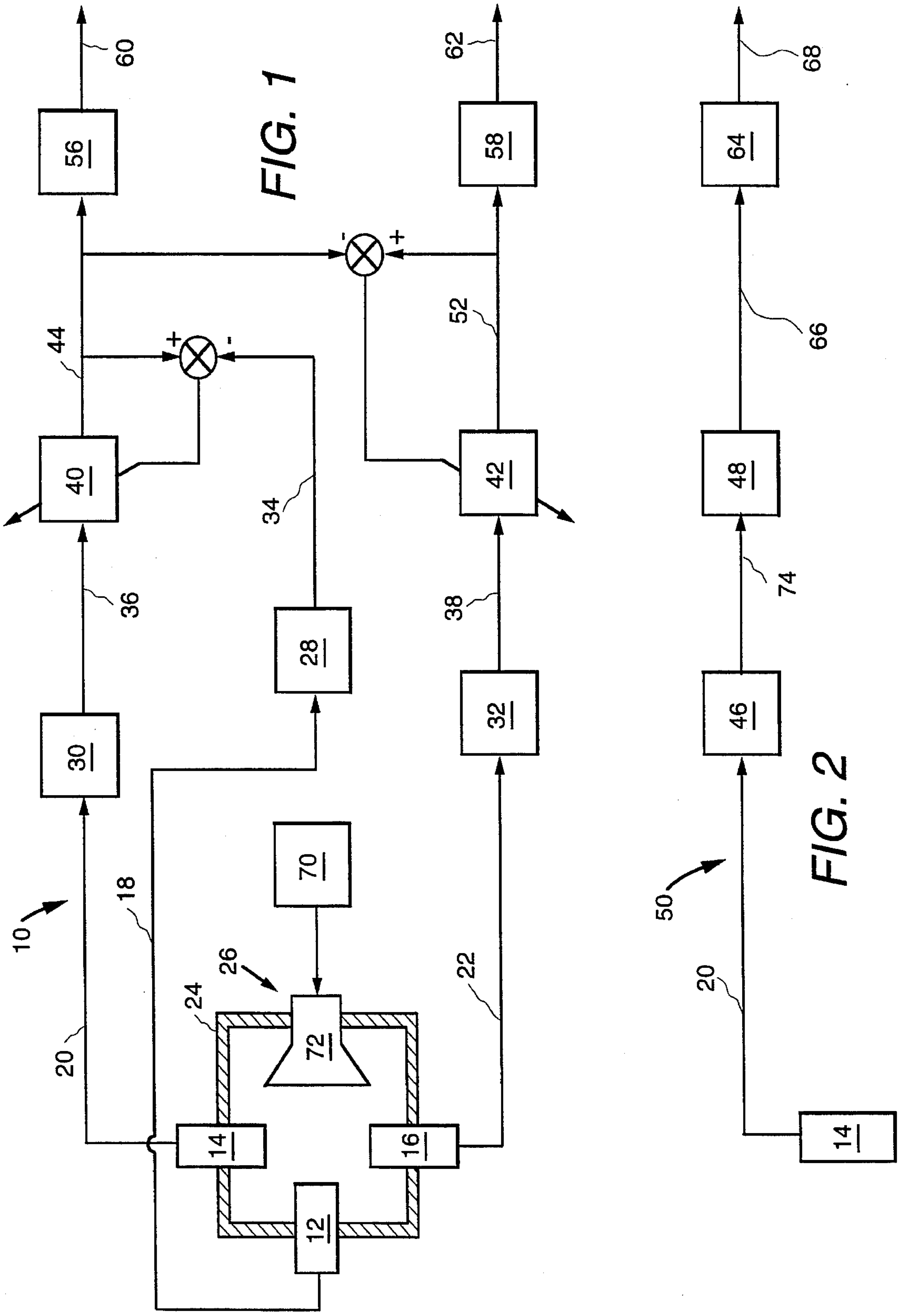
FIG. 1 is a schematic view of preferred apparatus used to match the output of a second sensor to the output of a first sensor.
FIG. 2 is a schematic view of a sensor assembly having a sensor with a compensated output.

Referring now to the drawings, wherein like numerals represent like elements throughout, FIG. 1 shows preferred apparatus 10 used for the method of the invention. Apparatus 10 includes first, second, and third unmatched sensors 12, 14, and 16 which sense the same physical quantity, which have corresponding first, second, and third outputs 18, 20, and 22, and which are disposed (e.g., placed partially within a housing 24) such that they may be generally identically and simultaneously exposed to a source 26 of the physical quantity they can sense. Preferably, the first sensor 12 is a reference sensor having an independently-calibrated amplitude and phase response, and the third sensor 16 is generally identical to the second sensor 14 to within predetermined manufacturing tolerances. Preferably, the first, second, and third sensors 12, 14, and 16 are pressure transducers (such as microphones), and the first, second, and third outputs 18, 20, and 22 are analog outputs which are corresponding first, second, and third electrical signals.

If the outputs 18, 20, and 22 are analog outputs, apparatus 10 additionally includes first, second, and third sensor-output processors 28, 30, and 32. The first, second, and third sensor-output processors 28, 30, and 32 each comprise an analog-to-digital converter having an analog input side operatively connected to the corresponding output (18, 20, or 22), having a sampling interval, and having a digital output side yielding a digital output for each sampling interval to present the first, second, and third outputs 18, 20, and 22 of the corresponding first, second, and third sensors 12, 14, and 16 as the corresponding sampled first, second, and third digital outputs 34, 36, and 38. In many applications, as can be appreciated by the artisan, the first, second, and third sensor-output processors 28, 30, and 32 each may also comprise an amplifier followed by a low-pass filter operatively connected between the corresponding output (18, 20, or 22) and the corresponding analog-to-digital converter for appropriate signal conditioning.

Apparatus 10 further includes a second adaptive filter 40 and a third adaptive filter 42. The second adaptive filter 40 has an input side operatively connected to the output side of the second sensor-output processor 30, has adaptive second filtering coefficients, and has a filtered second digital output 44 equal to the sum of the products of the second digital outputs 36 and the associated second filtering coefficients for numerically adaptively filtering the second digital output 36 until the adaptive second filtering coefficients are determined such that the filtered second digital output 44 matches the first digital output 34 to within a second predetermined value. Once this condition is satisfied, or during such times as this condition is satisfied, apparatus 10 can be further used with the second adaptive filter 40 utilizing the determined second filtering coefficients (i.e., the values of the adaptive second filtering coefficients which allow the filtered second digital output 44 to match the first digital output 34) for a fixed, non-adaptive mode of filtering. Alternatively, as shown in FIG. 2, the second sensor 14 can be removed from apparatus 10 and used with a sensor-output processor 46 and a filter 48 to at least partially define a sensor assembly 50. The sensor-output processor 46 is generally identical to the second sensor-output processor 30. The filter 48 is generally identical to the second adaptive filter 40 but with fixed filtering coefficients set equal to the adaptively-determined filtering coefficients, as can be appreciated by those skilled in the art.

The third adaptive filter 42 has an input side operatively connected to the output side of the third sensor-output processor 32, has adaptive third filtering coefficients, and has a filtered third digital output 52 equal to the sum of the products of the third digital outputs 38 and the associated third filtering coefficients for numerically adaptively filtering the third digital output 38 until the adaptive third filtering coefficients are determined such that the filtered third digital output 52 matches the filtered second digital output 44 to within a third predetermined value. Once this condition is satisfied, or during such times as this condition is satisfied, apparatus 10 can be further used with the third adaptive filter 42 utilizing the determined third filtering coefficients (i.e., the values of the adaptive third filtering coefficients which allow the filtered third digital output 52 to match the filtered second digital output 44) for a fixed, non-adaptive mode of filtering.

As can be appreciated by one skilled in the art, apparatus 10 may include a time delay to make sure that the time information takes to travel from the source 26 through the first sensor-output processor 28 (via the first sensor 12) is greater than or equal to the time information takes to travel from the source 26 through the second sensor-output processor 30 (via the second sensor 14), and that the time information takes to travel from the source 26 through the first sensor-output processor 28 (via the first sensor 12) is greater than or equal to the time information takes to travel from the source 26 through the third sensor-output processor 32 (via the third sensor 16). This insures that the system is causal, as can be appreciated by those skilled in the art. For example, the first sensor-output processor 28 may include a time delay following its analog-to-digital converter to delay the first digital output 34, or the first sensor 12 may be disposed slightly further away from the source 26 than the second and third sensors 14 and 16 (while still considering all three sensors 12, 14, and 16 to be generally identically and simultaneously exposed to the source 26).

A first preferred method of the invention is for matching the second output 20 of the second sensor 14 to the first output 18 of the first sensor 12, wherein (as previously mentioned) the first and second sensors 12 and 14 sense the same physical quantity. The method comprises the steps of: a) generally identically and simultaneously exposing the first and second sensors 12 and 14 to the source 26 of the physical quantity they can sense; b) presenting the first output 18 of the first sensor 12 as the sampled first digital output 34; c) presenting the second output 20 of the second sensor 14 as the sampled second digital output 36; and d) numerically adaptively filtering the second digital output 36 with the second filter 40 having adaptive second filtering coefficients until the second filtering coefficients are determined such that the filtered second digital output 44 matches the first digital output 34 to within the second predetermined value. It is noted that this method ensures that the phase and amplitude of the second sensor 14 will be matched to the phase and amplitude of the first sensor 12. When the first sensor 12 is a precision reference sensor, the filtered second digital output 44 is not only a matched response but is also a highly accurate response.

A second preferred method of the invention is for also matching the third output 22 of the third sensor 16 to the second output 20 of the second sensor 14, wherein the third sensor 16 is generally identical to the second sensor 14 to within predetermined manufacturing tolerances. The method also comprises the steps of: e) exposing the third sensor 16 to the source 26 generally identically and simultaneously to the exposing of the first and second sensors 12 and 14 to the source 26 in step a); f) presenting the third output 22 of the third sensor 16 as a sampled third digital output 38; and g) numerically adaptively filtering the third digital output 38 with the third filter 42 having adaptive third filtering coefficients until the third filtering coefficients are determined such that the filtered third digital output 52 matches the filtered second digital output 44 to within the third predetermined value. It is noted that the third adaptive filter 42 compares the filtered third digital output 52 with the filtered second digital output 44 (instead of with the first digital output 34) which in practice may more accurately match the phase response of the third sensor 16 to the phase response of the second sensor 14.

Preferably, the first, second, and third sensors 12, 14, and 16 comprise pressure transducers (such as microphones); the first, second, and third outputs 18, 20, and 22 comprise first, second, and third analog outputs; and the first, second, and third analog outputs comprise first, second, and third electrical signals. In an exemplary method, step b) comprises converting the first electrical signal to the first digital output 34, step c) comprises converting the second electrical signal to the second digital output 36, and step f) comprises converting the third electrical signal to the third digital output 38.

Preferably, the method also includes the step of numerically filtering the second digital output 36 using the determined second filtering coefficients when the filtered second digital output 44 matches the first digital output 34 to within the second predetermined value, and the method further includes the step of numerically filtering the third digital output 38 using the determined third filtering coefficients when the filtered third digital output 52 matches the filtered second digital output 44 to within the third predetermined value.

It is noted that the filtered (compensated) second and third digital outputs 44 and 52 may be used as inputs to a digital computer or other digital device. Alternately, apparatus 10 may be provided with second and third filter-output processors 56 and 58 (each comprising an digital-to-analog converter and, if desired by the artisan, a low-pass filter and an output amplifier) if filtered (compensated) second and third analog outputs 60 and 62 are desired. Likewise, sensor assembly 50 may be provided with a filter-output processor 64, which is generally identical to the second filter-output processor 56, to change the filtered (compensated) digital output 66 into a filtered (compensated) analog output 68.

In an exemplary method, all of the method steps are performed generally in real time. Known digital signal processors may be programmed for adaptive filtering, as is within the skill of the artisan. For example, the second adaptive filter 40 can be programmed such that:

$$Y(k)=X(l)W(0)+X(k-1)W(1)+\ldots+X(k-n)W(n)$$

where n is a predetermined number of sampling intervals chosen by the artisan for the adaptive filtering, k is the present sample interval, k–1 is the first previous sample interval, k–n is the nth previous sample interval, Y(k) is the filtered second digital output 44 for the present sample interval, X(k) is the second digital output 36 for the present sample interval, and W(n) is the adaptive filtering coefficient associated with the second digital output 36 for the (k-n)th previous sample interval. One known technique for updating the adaptive filtering coefficients is:

$$\text{updated } W(0)=\text{old } W(0)^{\circ}2cE(k)X(k),$$

$$\text{updated } W(1)=\text{old } W(1)+2cE(k)X(k-1),\ldots$$

$$\text{updated } W(n)=\text{old } W(n)+2cE(k)X(k-n)$$

where E(k) is the difference between Z(k) and Y(k), Z(k) is the first digital output 34 for the present sample interval, and c is a convergence constant that affects the algorithm adaptation speed and is chosen by the artisan. Preferably, once the adaptive filtering coefficients have converged such that Y(k) and Z(k) are equal to within the second predetermined value, the adaptive filtering coefficients W(0), W(1), . . . , W(n) are no longer updated. The adaptive filtering coefficients are then said to be determined and are fixed in value.

Applicants carried out preliminary testing of their invention using a pair of unmatched audio-grade microphones (costing a couple of dollars) in a test rig similar to the apparatus 10 shown in FIG. 1. The source 26 included a noise generator 70 driving a loudspeaker 72 to produce broadband, stationary noise. The electrical signal outputs 18 and 20 from the microphones 12 and 14 were processed by the sensor-output processors 28 and 30 (costing a few dollars) which included low-pass filters and amplifiers to match the dynamic range of its analog-to-digital converters. The adaptive filtering was implemented and performed in real-time using a Motorola DSP56000 digital signal processor 40 (costing ten dollars or so). Digital sampling was done at a rate of 5,000 times a second, the value of n was chosen as 200, the source 26 was a source of white noise, and no time delay was used. The filter-output processor 56 included a digital-to-analog converter, a low-pass filter, and an output amplifier. The filtered second analog output 60 was compared to the first output 18. Without the present invention, the microphone pair phase mismatch was about 10 degrees at a frequency of about 40 Hz, the phase mismatch decreased to about 1 degree at about 200 Hz, the phase mismatch increased to about 2 degrees at about 600 Hz, and the phase mismatch remained at about 2 degrees to 1200 Hz. Without the present invention, the microphone pair amplitude mismatch was always at least about 3 dB at a frequency from about 40 Hz to 1200 Hz. With the invention, the phase mismatch was always less than about 0.2 degrees at a frequency from about 40 Hz to 1200 Hz, and the amplitude mismatch was always less than about 0.2 dB at a frequency from about 40 Hz to 1200 Hz. The total calibration time to determine the adaptive filtering coefficients for phase and amplitude matching was under one second. The matched results of the invention are within the specifications of high quality commercially available phase and amplitude matched microphone pairs costing several thousands of dollars per pair.

It is noted that the use of variable-gain or auto-ranging input amplifiers will ensure good matching of the input levels with the dynamic range of the analog-to-digital converters, resulting in optimum performance. Also critical to system performance are high-accuracy analog-to-digital and digital-to-analog converters. Converters having at least 16-bit accumulators are recommended. System performance is limited mainly by the 16-bit resolution of the converters rather than by the computational noise of the filtering because the relatively low-cost fractional digital signal processors (such as the Motorola DSP56000) have 40-bit or better accumulators. Therefore, the use of slightly higher cost, more accurate floating-point digital signal processors may not be warranted.

As shown in FIG. 2, a preferred embodiment of the sensor assembly 50 comprises a sensor (i.e., the second sensor 14) having an analog output. Preferably, the sensor is a pressure transducer such as a microphone The sensor assembly 50 additionally comprises the sensor-output processor 46 which includes an analog-to-digital converter having: an analog input side operatively connected to the second output 20 which is an analog output; a sampling interval; and a digital output side yielding a digital output 74 for each sampling interval. The sensor assembly 50 further comprises the filter 48 which has an input side operatively connected to the digital output side of the analog-to-digital converter and which has its filtered digital output 66 (the output of filter 48) equal to the sum of the products of the digital outputs 74 and associated fixed filtering coefficients, the sum taken over a predetermined number (e.g., n) of sampling intervals, and the fixed filtering coefficients being set equal to filtering coefficients adaptively-determined such that the filtered digital output 66 (the output of filter 48) generally matches (e.g., matches within the second predetermined value) a reference digital output (e.g., the first digital output 34) from a reference sensor (e.g., the uncalibrated or calibrated first sensor 12).

The foregoing description of a preferred embodiment of the invention has been presented for purposes of illustration. It is not intended to be exhaustive or to limit the invention to the precise form disclosed, and obviously many modifications and variations are possible in light of the above teaching. For example, the sensors are not limited to microphones or other pressure transducers, an analog-to-digital converter having multiple inputs and outputs is equivalent to separate analog-to-digital converters each having one input and one output, inputs to analog-to-digital converters may be multiplexed to reduce the number of analog-to-digital converters, and more than two sensors may be matched to a reference sensor. It is intended that the scope of the invention be defined by the claims appended hereto.

We claim:

1. A sensor assembly comprising:

a) a sensor having an analog output;

b) an analog-to-digital converter having an analog input side operatively connected to said analog output, having a sampling interval, and having a digital output side yielding a digital output for each said sampling interval; and c) a filter having an input side operatively connected to the digital output side of said analog-to-digital converter and having an output equal to the sum of the products of said digital outputs and associated fixed filtering coefficients, said sum taken over a predetermined number of said sampling intervals, and said fixed filtering coefficients being set equal to filtering coefficients adaptively-determined such that said output of said filter generally matches a reference digital output from a reference sensor.

2. The sensor assembly of claim 1, wherein said sensor comprises a pressure transducer.

* * * * *